United States Patent [19]
Carmody

[11] Patent Number: 6,063,163
[45] Date of Patent: May 16, 2000

[54] CO-CURRENT AND COUNTER-CURRENT GAS DEHYDRATION SYSTEM

[75] Inventor: Paul Carmody, Spring, Tex.

[73] Assignee: Amerada Hess Corporation, Houston, Tex.

[21] Appl. No.: 09/090,360

[22] Filed: Jun. 4, 1998

[51] Int. Cl.[7] .................................................. B01D 53/14
[52] U.S. Cl. ................................ 95/187; 95/199; 95/223; 95/231; 96/234; 96/256; 96/262; 96/295
[58] Field of Search ........................... 96/262, 256, 265, 96/272, 273, 295, 234; 95/223, 224, 231, 187, 188, 190, 199, 200, 202

[56] References Cited

U.S. PATENT DOCUMENTS

| 2,690,814 | 10/1954 | Reid | 183/114.6 |
|---|---|---|---|
| 2,812,827 | 11/1957 | Worley et al. | 183/2.7 |
| 2,812,830 | 11/1957 | Sattler et al. | 183/120 |
| 2,871,979 | 2/1959 | Scofield | 95/231 |
| 2,996,142 | 8/1961 | Worley | 95/223 |
| 3,212,238 | 10/1965 | Welch et al. | 55/208 |
| 3,234,712 | 2/1966 | Lovett et al. | 95/231 |
| 3,331,188 | 7/1967 | Sinex | 55/31 |
| 3,367,089 | 2/1968 | Scott | 55/208 |
| 3,541,763 | 11/1970 | Heath | 55/185 |
| 3,664,091 | 5/1972 | Hegwer | 95/231 |
| 3,770,622 | 11/1973 | Freireich et al. | 95/188 |
| 4,005,997 | 2/1977 | Fowler et al. | 95/190 |
| 4,070,165 | 1/1978 | Colton | 55/30 |
| 4,375,977 | 3/1983 | Honerkamp et al. | 55/234 |
| 4,432,779 | 2/1984 | Honerkamp et al. | 55/233 |
| 4,455,157 | 6/1984 | Honerkamp et al. | 55/234 |
| 4,701,188 | 10/1987 | Mims | 55/20 |
| 4,775,395 | 10/1988 | Rojey et al. | 95/190 |
| 5,490,873 | 2/1996 | Behrens et al. | 95/231 |
| 5,693,297 | 12/1997 | Turner et al. | 95/231 |

OTHER PUBLICATIONS

Chapter 11 "Absorption and Fraction Fundamentals", pp. 129–151, no date.
Chapter 18 "Absorption Dehydration", pp. 293–303, no date.
Chapter 11 "Absorption of Water Vapor by Dehydrating Solutions", pp. 582–617, no date.
Pearce, Sivalls, "Fundamentals of Gas Dehydration Design and Operation with Glycol Solutions", The Gas Conditioning Conference, Norman, OK, Mar. 5–7, 1984.

Primary Examiner—Duane S. Smith
Attorney, Agent, or Firm—Jenkens & Gilchrist

[57] ABSTRACT

According to the present invention, an inexpensive co-current and counter-current gas dehydration system, contactor apparatus, and operating method is provided which does not result in a need to clean equipment on a frequent basis. More specifically, there is provided a dehydration system, contactor apparatus, and method for removing water from a stream of wet natural gas which minimizes formation or iron sulfide scale within the contactor apparatus to maintain sufficient water removal capacity and to reduce operator cleanup and construction expenses. The instant invention improves the utilization of the water absorbing capabilities of glycol by using partially water laden glycol extracted from the central portion of the contactor apparatus in a co-current flow with wet natural gas to maximize the operating efficiency of the contactor apparatus.

26 Claims, 4 Drawing Sheets

CO-CURRENT AND COUNTER-CURRENT GAS DEHYDRATION SYSTEM

FIELD

The present invention relates to dehydrating wet gas; more particularly, the present invention is described as part of a system for dehydrating wet natural gas using a liquid desiccant.

BACKGROUND

Natural gas, as it occurs in nature, contains many contaminants, the most common of which is water. The dehydration of natural gas or the removal of water from natural gas is done to control the formation of gas hydrates and corrosion in distribution pipelines. The formation of gas hydrates and corrosion in distribution pipelines can actually cause the complete shutoff of gas flow under severe conditions and at best will result in decreased throughput, frozen control valves, plugged orifices and many similar operating problems.

To control the formation of gas hydrates and corrosion in natural gas distribution pipelines, the well-known method of "glycol dehydration" or "liquid desiccant dehydration" is typically used to extract water from natural gas. In conventional glycol dehydrating systems, wet natural gas enters the bottom of an absorber (or contactor) and is then contacted counter-currently with glycol or some other liquid desiccant. More specifically, the wet natural gas is mixed and/or contacted with glycol; the glycol absorbs the water from the natural gas; the glycol is then heated to separate the water from the glycol; and the substantially anhydrous glycol is recirculated back into the contactor for absorption and/or admixing with wet natural gas, in a continuous process. Suitable liquid desiccants have included ethylene glycol, diethylene glycol, and triethylene glycol. Persons skilled in the art typically show a preference for triethylene glycol.

As noted above, in conventional glycol dehydrating systems, wet natural gas is contacted with substantially anhydrous glycol in an absorber or contactor. Unfortunately, hydrogen sulfide, which is a wet natural gas impurity in some natural gas streams (termed "sour gas"), reacts with the iron in steel contactors to produce iron sulfide scale. Those skilled in the art will also understand that iron sulfide scale is also a problem in systems dehydrating sweet gas. As the concentration of iron sulfide scale increases, it plugs up the steel contactor and diminishes the contactor's capacity to remove water from wet natural gases. Eventually, the iron sulfide scale build up within the contactor becomes so large that the contactor operator must totally shut down the contactor to clean out the iron sulfide scale. Rather than incurring the expense of shutdown and cleanups, some operators have deterred the formation of iron sulfide scale by making contactors from stainless steel. But, this alternative is not free of considerable expense.

Another difficulty associated with most conventional glycol dehydration systems is that to achieve sufficient volume for effective contact between the wet natural gas and the dehydrating glycol, it has been necessary to construct contactors of relatively tall vertical height to accommodate the required number of trays. Of course, additional trays add to the cost of the contactor.

There is therefore a need in the art for an inexpensive apparatus and method for dehydrating wet natural gas which does not need to be cleaned on a frequent basis.

SUMMARY

According to the present invention, an inexpensive co-current and counter-current gas dehydration system, contactor apparatus, and operating method is provided which does not result in a need to clean dehydration equipment on a frequent basis. More specifically, there is provided by the present invention, a dehydration system, contactor apparatus, and method for removing water from a stream of wet natural gas which minimizes the formation of iron sulfide scale and corrosion within the contactor apparatus while enhancing its water removal capacity. The instant invention improves utilization of the water absorbing capabilities of glycol to improve the efficiency of the contactor apparatus.

Specifically, substantially anhydrous glycol is introduced at the top of the contactor apparatus counter to the flow of wet natural gas through the contractor apparatus. A flow of partially water laden glycol is extracted from the central portion of the contractor apparatus. This flow of partially water laden glycol is combined with the flow wet natural gas at an orifice plate and is passed co-current into the bottom of the contactor apparatus. The water laden glycol is extracted from the bottom of the contactor apparatus and the substantially dry natural gas is removed from the top of the contactor apparatus.

BRIEF DESCRIPTION OF THE DRAWINGS

A better understanding of the co-current and counter-current gas dehydration system of the present invention may be had by reference to the drawings wherein.

DESCRIPTION OF THE EMBODIMENTS

Figure 1:
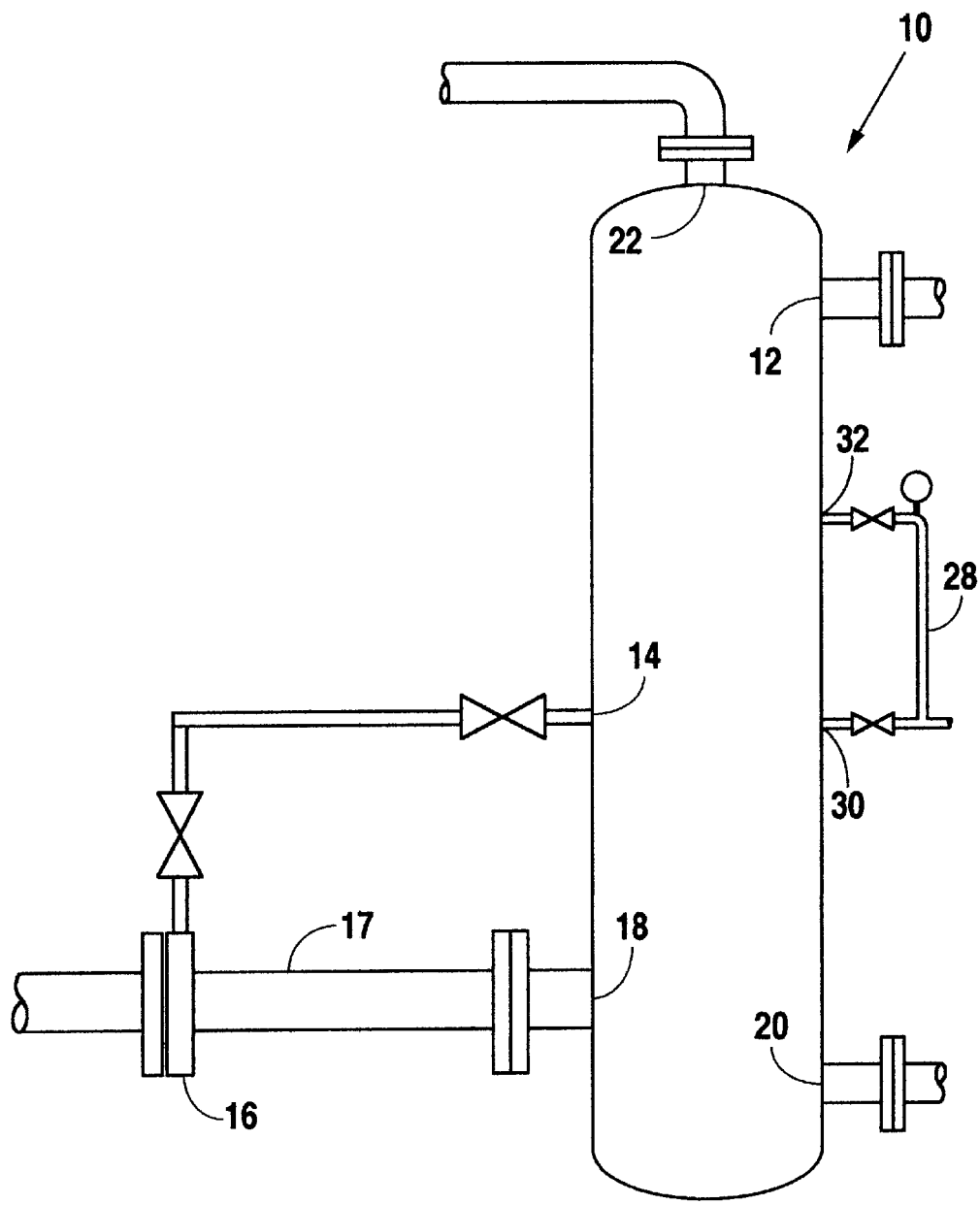
FIG. 1 is a partial schematic view of the co-current and counter-current gas dehydration system of the present invention.
Figure 2:
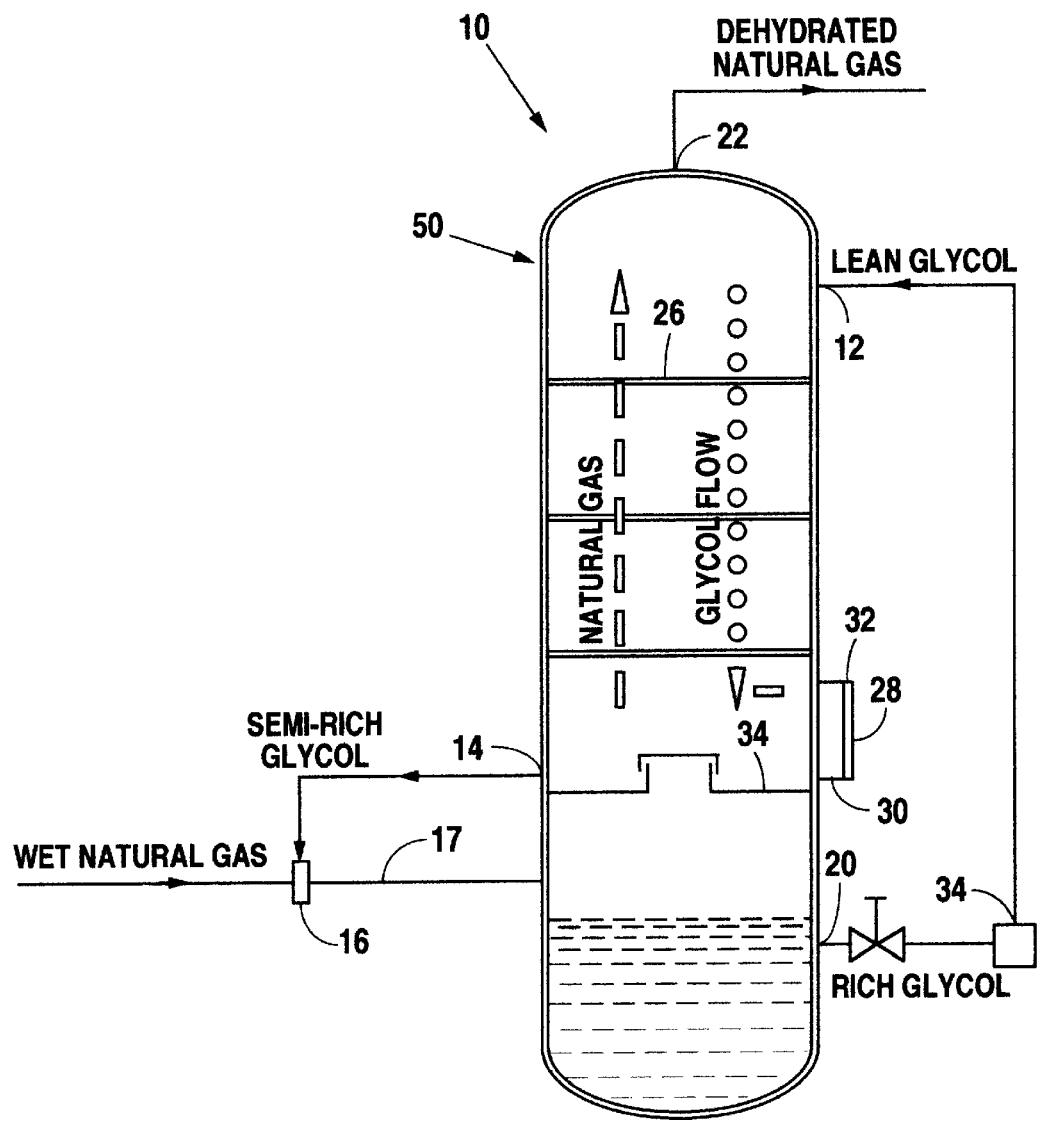
FIG. 2 is a partial schematic view similar to FIG. 1 of the preferred embodiment of a contactor apparatus for dehydrating a stream of natural gas.

With reference to FIG. 1 and FIG. 2, a preferred embodiment of the co-current and counter-current gas dehydration system 10 of the present invention for removing water from a stream of wet natural gas flowing from the bottom to the top of the contactor apparatus 50 is shown.

The contactor apparatus 50 has a first port 12 for introducing lean or substantially anhydrous glycol into the top of the contactor apparatus 50 counter to the flow of wet natural gas upward from the bottom of the contactor apparatus 50; a second port 14 for extracting a flow of semi-rich or partially water laden glycol from the contactor apparatus 50, said second port 14 being located in the central portion of the contactor apparatus 50; an orifice plate 16 or other suitable means for creating a co-current flow of semi-rich glycol intimately mised with wet natural gas; a pipe 17 connecting the orifice plate 16 to a third port 18 for introducing said co-current flow of semi-rich glycol and wet natural gas into the bottom of the contactor apparatus 50; a fourth port 20 for extracting water laden or rich glycol from the bottom of the contactor apparatus 50; and a fifth port 22 for extracting dehydrated or substantially dry natural gas from the top of the contactor apparatus 50.

As shown in FIG. 2, the dehydration system 10 may also include a reboiler or a reconcentrator 24 for reconditioning or removing water from the rich glycol to yield lean glycol.

The reboiler or a reconcentrator 24 or other suitable reconditioning means, such as a stripper, allows the system 10 of the present invention to operate continuously with minimal additions of fresh glycol. Other modifications to render the operation of the system 10 continuous would be readily apparent to a person skilled in the art and are contemplated to be within the scope of this invention.

While the contactor apparatus of the present invention 50 is shown with a series of bubble trays 26, other types of contactor apparatus 50 such as a structured packed column or a random packed column, are contemplated and considered to be within the scope of this invention. Moreover, while the contactor apparatus 50 is fitted with an orifice plate 16, other means, such as a venturi, or an atomizer, for creating a co-current flow of semi-rich glycol and wet natural gas in pipe 17 are contemplated and are also considered to be within the scope of this invention.

The method of operation of the contactor apparatus 50 will now be described to provide a better understanding of the system shown in FIG. 1 and FIG. 2. A flow of lean glycol (or substantially anhydrous glycol), shown by the row of small circles in FIG. 2, is introduced at the top of the contactor apparatus 50 through the first port 12 counter to the anticipated flow of wet natural gas through the contactor apparatus 50. The flow of partially dehydrated natural gas is shown by the row of small rectangles in FIG. 2. A flow of semi-rich glycol is extracted from the central portion of the contactor 10 through the second port 14 without using flow controls or pumps. If desired, a nozzle may be used downstream of the second port 14 to create a suction to enhance the flow of semi-rich glycol. The lean glycol entering through the first port 12 becomes partially water-laden as it contacts the natural wet gas in counter-current flow to yield the semi-rich glycol. As the contact between the glycol and the wet natural gas increases in counter-current flow in the upper portion of the contactor apparatus 50, the flowing glycol continues to absorb more water from the wet natural gas and thereby, becomes semi-rich glycol. As soon as the wet natural gas and the extracted flow of semi-rich glycol pass come together at the orifice plate 16, a co-current flow of wet natural gas and semi-rich glycol is created through pipe 17. The removal of water from the wet natural gas by the semi-rich glycol begins immediately.

The co-current flow of wet natural gas and semi-rich glycol is introduced into the bottom of the contactor apparatus 50 through the third port 18, the wet natural gas entering through the third port 18 travels upward through the contractor apparatus 50 past a hat or chimney tray 34. Alternatively, a seal pan may be used. Such hat trays, chimney trays, and seal pans are well known in the art. The co-current flow contact of wet natural gas and semi-rich glycol from the orifice plate 16 to the third port 18 through pipe 17 immediately results in the absorption of water from the wet natural gas by the semi-rich glycol, thereby rendering the semi-rich glycol more water-laden or richer. The rich glycol collects in the bottom of the contactor apparatus 50 and is extracted from the bottom of the contactor apparatus 50 through the fourth port 20. The rich glycol may then be reconditioned by a reboiler or reconcentrator 24 or other suitable means to yield lean glycol for recycling back through the top of the contactor apparatus 50. The wet natural gas flowing up from the bottom of the contactor apparatus 50 is then contacted counter-currently with the lean glycol introduced through the first port 12 on top of the contactor apparatus 50. The dehydrated natural gas is extracted from the top of contactor apparatus 50 through the fifth port 22.

In actual operation, the system of the present invention included a sight glass 28 which was connected to the contactor apparatus 50 at ports 30 and 32.

The glycol passing through the contactor apparatus 50 was analyzed to determine how much water it actually contained. The following results were produced:

| Location | Glycol % H$_2$O |
| --- | --- |
| 12 | 0.712 |
| 30 | 2.110 |
| 20 | 4.820 |

It was determined therefore that by adding the step of introducing semi-rich glycol in a co-current manner into the entering stream of wet natural gas, approximately 66% of the water in the wet natural gas was removed by the semi-rich glycol. A dew point reduction of 92° F. was achieved by the system 10 with only a four tray contactor.

Figure 3:
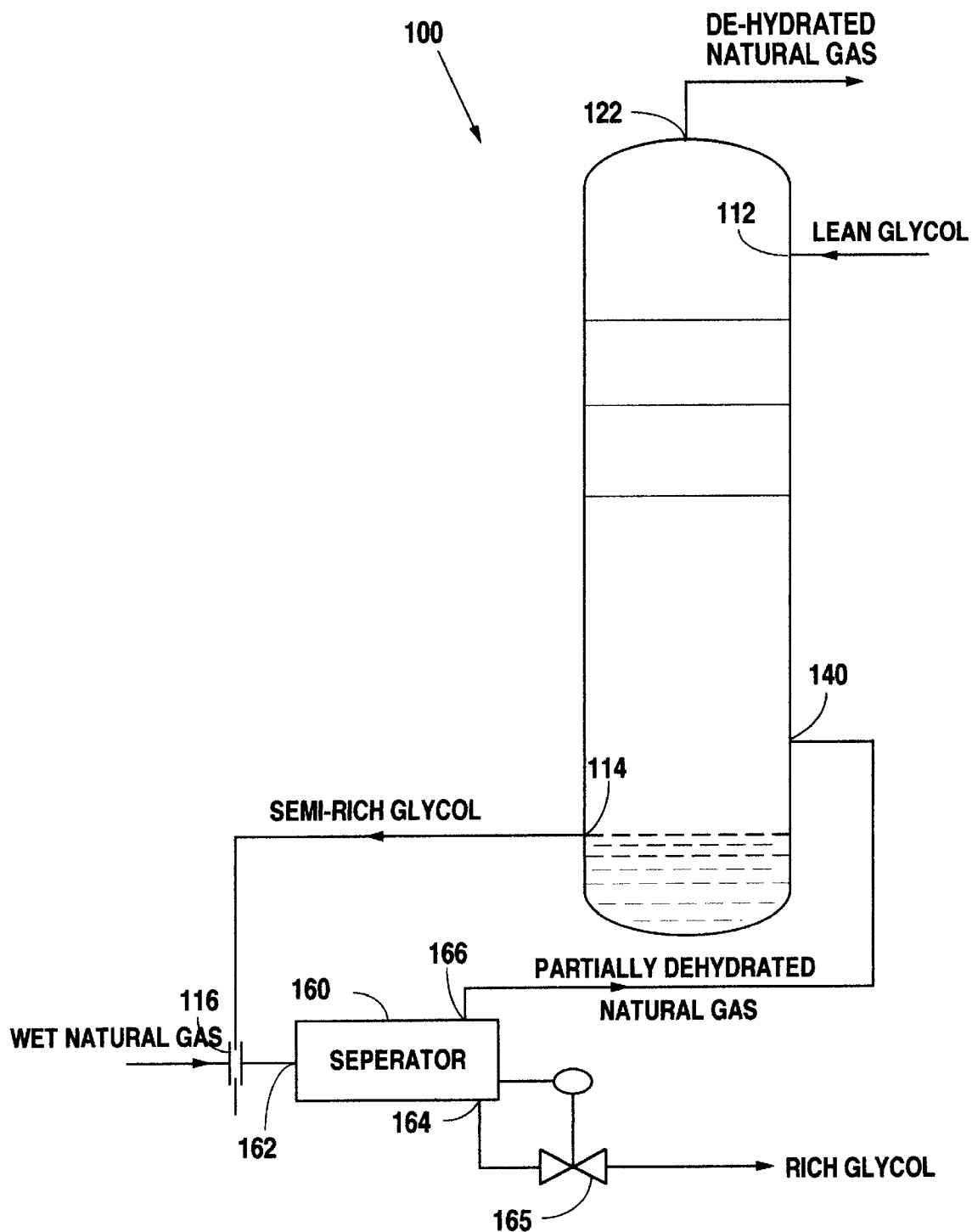
FIG. 3 is a schematic view of a first alternate embodiment of the co-current and counter current gas dehydration system of the present invention.

Next, with reference to FIG. 3, a first alternate embodiment of a dehydrator system 100 for dehydrating wet natural gas is shown. The dehydrator system 100 has a contactor apparatus 150 for dehydrating a stream of partially dehydrated natural gas flowing from the bottom to the top of the contactor apparatus 150 and a separator 160 for separating rich glycol from a co-current flow of semi-rich glycol and wet natural gas. The contactor apparatus 150 has a first port 112 for introducing lean glycol into the top of the contactor apparatus 150 counter to the flow of partially dehydrated natural gas through the contactor apparatus 150; a second port 114 for extracting a flow of semi-rich glycol from the contactor apparatus 150, said second port 114 being located in the central or the lower portion of the contactor apparatus 150; a third port 140 for introducing the flow of partially dehydrated natural gas; and a fourth port 122 for extracting dehydrated natural gas from the top of the contactor apparatus 150. The separator 160 has an inlet port 162 for introducing said co-current flow of semi-rich glycol and wet natural gas into the separator 160; an orifice plate 116 or other means for creating a co-current flow of semi-rich glycol and wet natural gas from said flow of semi-rich glycol and wet natural gas; a glycol exit port 164 for extracting rich glycol through an automatic control valve 165 (or alternatively a pump) from the bottom of the separator 160; and a gas exit port 166 for extracting partially dehydrated natural gas from the top of the separator 160.

The method of operation of the dehydrator system 100 shown in FIG. 3 will now be described. Lean glycol (or substantially anhydrous glycol) is introduced at the top of the contactor apparatus 150 through port 112 counter to an anticipated stream of partially dehydrated natural gas flowing from near the bottom to the top of the contactor apparatus 150. A flow of semi-rich glycol is extracted from the central portion or lower portion of the contactor apparatus 150 through the second port 114. Wet natural gas and the flow of semi-rich glycol are passed through an orifice plate 116 or other means for creating a co-current flow of wet natural gas and semi-rich glycol. The removal of water from the wet natural gas begins immediately. The co-current flow of wet natural gas and semi-rich glycol is introduced into the separator 160 through port 162. The rich glycol and a stream of partially dehydrated natural gas are separated. Rich glycol is extracted from the bottom of the separator 160 through the inlet port 164. The rich glycol is then reconditioned by a reboiler or other suitable means to yield lean glycol for recycling back through the contactor apparatus 150. After the rich glycol is extracted, the stream of partially dehydrated natural gas remains. The stream of partially dehydrated natural gas is extracted from the top of separator 160 through the gas exit port 166 and introduced back into the contactor apparatus 150 through a gas entry port 140. The stream of partially dehydrated natural gas is counter-currently contacted in the contactor apparatus 150 with lean glycol introduced through the first port 112. The dehydrated natural gas is extracted from the top of contactor apparatus 150 through a gas exit port 122.

Figure 4:
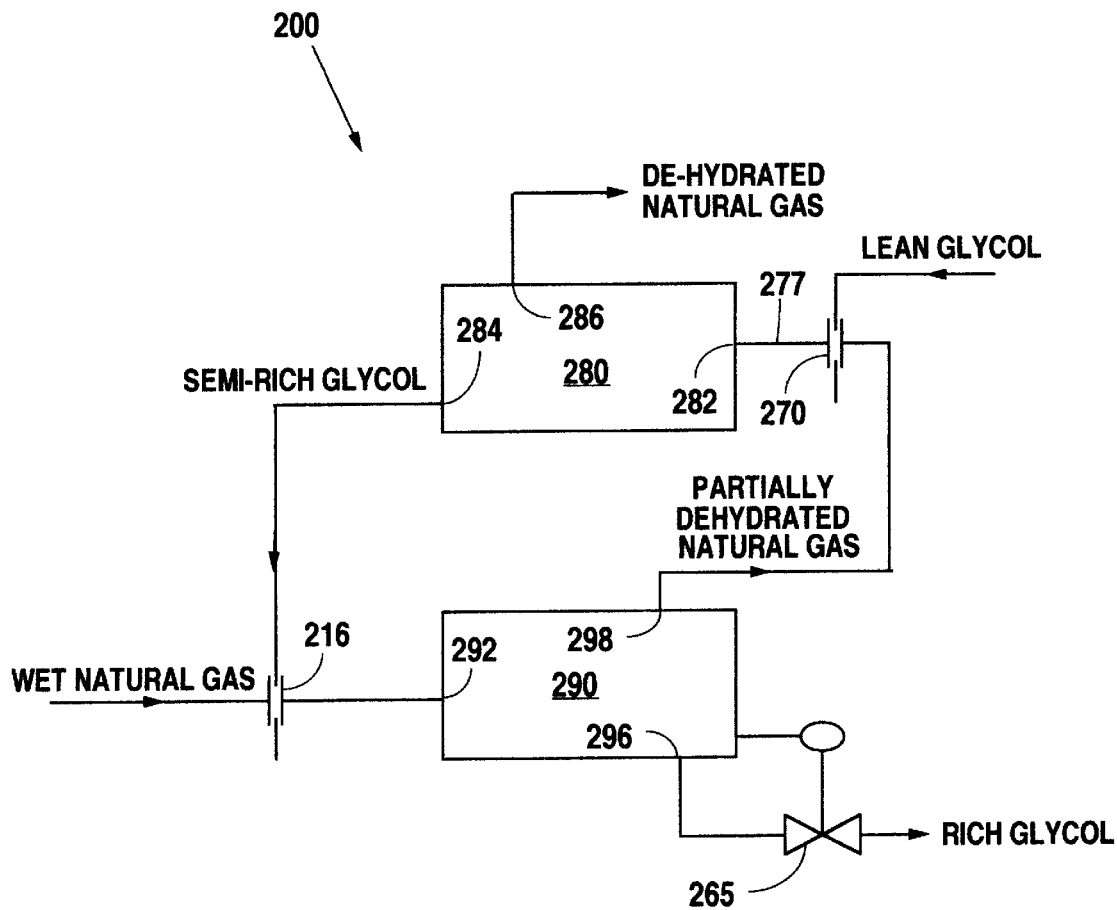
FIG. 4 is a schematic view of a second alternate embodiment.

Finally, with reference to FIG. 4, a second alternate embodiment 200 of a dehydrator system for dehydrating wet natural gas is shown. The dehydrator system 200 has a nozzle 270 or other suitable means for introducing lean glycol into the flow of partially dehydrated natural gas immediately preceding a first separator 280 to form a co-current flow of lean glycol and partially dehydrated natural gas for dehydrating a stream of partially dehydrated natural gas; and a second separator 290 for separating rich glycol from a co-current flow of the semi-rich glycol and wet natural gas. The first separator 280 has a first port 282 for introducing a co-current flow of lean glycol and partially dehydrated gas into the first separator 280; a second port 284 for extracting a flow of semi-rich glycol from the first separator 280; and a third port 286 for extracting dehydrated natural gas from the top of the first separator 280. The second separator 290 has a first port 292 for introducing said co-current flow of semi-rich glycol and wet natural gas into the second separator 290; an orifice plate 216 or other suitable means for creating a co-current flow of semi-rich glycol and wet natural gas; a second port 296 for extracting rich glycol from the bottom of the second separator 290 through an automatic control valve 265 (or alternatively a pump), thereby leaving the stream of partially dehydrated natural gas; and a third port 298 for extracting said stream of partially dehydrated natural gas from the top of the second separator 290.

The method of operation of the dehydrator system 200 shown in FIG. 4 will now be described. Lean glycol (or substantially anhydrous glycol) is introduced by a nozzle 270 or other suitable means into the anticipated flow of a stream of partially dehydrated natural gas immediately preceding the first separator 280 and then mixed to form a co-current flow of lean glycol and partially dehydrated natural gas. Water extraction begins immediately and continues through pipe 277 leading into the first separator 280. The co-current flow of lean glycol and partially dehydrated natural gas is introduced into the first separator 280. Dehydrated natural gas and a flow of semi-rich glycol are separated. The dehydrated natural gas is extracted from the top of the first separator 280 through the third port 286. The flow of semi-rich glycol is extracted from the first separator 280 through the second port 284. Wet natural gas and the flow of semi-rich glycol are passed through an orifice plate 216 or other suitable means for creating a co-current flow of semi-rich glycol and wet natural gas. Water extraction begins immediately. The co-current flow of semi-rich glycol and wet natural gas is then introduced into the second separator 290 through the first port 292. The stream of partially dehydrated natural gas and rich glycol are separated. Rich glycol is extracted from the bottom of second separator 290 through the second port 296 and an automatic control valve 265 (or alternatively a pump). The rich glycol may then be reconditioned by a reboiler or other suitable means to yield lean glycol for recycling through the first separator 280. After the rich glycol is extracted, the stream of partially dehydrated natural gas remains. This stream of partially dehydrated natural gas is extracted from the top of the second separator 290 through the third port 298 and for mixing with lean glycol before being introduced as part of a co-current flow into the first separator 280 through the first port 282. While this method employs co-current mixing of glycol, the overall arrangement is counter-current because lean glycol contacts partially dehydrated natural gas and semi-rich glycol contacts wet natural gas.

This invention can also significantly improve existing wet natural gas dehydrating capacity without the considerable expense of presently available methods. Also, this invention provides a way to increase wet natural gas contact with glycol without adding a second source of glycol or increasing the quantity of anhydrous glycol used. Moreover, this invention overcomes the costs associated by adding additional trays to presently available systems by partially dehydrating the wet natural gas before introducing the wet natural gas into the contactor. Significantly, the partial dehydration is accomplished with semi-rich glycol. A person of skill in the art will appreciate how to retrofit existing contactor apparatus installations to take advantage of this invention.

The embodiments described herein are given to illustrate the scope and spirit of the present invention. The embodiments herein will make apparent to those skilled in the art other embodiments which may not only be used with natural gas but may also be used with other gases or sweet gas streams where water or other containments must be removed. These other embodiments are within the scope of the present invention. Thus, the scope of the invention should be determined by the appended claims and their legal equivalents, rather than by the embodiments given herein.

What is claimed is:

1. A method for dehydrating a stream of wet natural gas flowing from the bottom to the top of a contactor apparatus, said method comprising the steps of:
 a. introducing lean glycol at the top of the contactor apparatus counter to the flow of wet natural gas through the contactor apparatus;
 b. extracting a flow of semi-rich glycol from the central portion of the contactor apparatus;
 c. passing wet natural gas and said flow of semi-rich glycol through an orifice plate to form a co-current flow of wet natural gas and semi-rich glycol;
 d. introducing said co-current flow of natural gas and glycol into the bottom of the contactor apparatus;
 e. extracting rich glycol from the bottom of the contactor apparatus; and
 f. extracting dehydrated natural gas from the top of the contactor apparatus.

2. The method of claim 1, wherein the glycol is selected from the group consisting of ethylene glycol, diethylene glycol, and triethylene glycol.

3. The method of claim 1, wherein the contactor apparatus is selected from the group consisting of a tray contactor apparatus, a structured packed column contactor apparatus or a random packed column contactor apparatus.

4. The method of claim 1, further including the step of
 g. reboiling the rich glycol to yield lean glycol.

5. The method of claim 1, further including the step of
 g. stripping the rich glycol to yield lean glycol.

6. A method for dehydrating a stream of wet natural gas, said method comprising the steps of:
 a. introducing lean glycol at the top of a contactor apparatus counter to a stream of natural gas flowing from the bottom to the top of said contactor apparatus;

b. extracting a flow of semi-rich glycol from the central portion of said contactor apparatus;

c. passing wet natural gas and said flow of semi-rich glycol through an orifice plate to form a co-current flow of wet natural gas and semi-rich glycol;

d. separating rich glycol from said co-current flow of wet natural gas and semi-rich glycol, thereby leaving a stream of partially dehydrated natural gas;

e. extracting the stream of partially dehydrated natural gas;

f. introducing the stream of partially dehydrated natural gas into the bottom of the contactor apparatus; and g. extracting dehydrated natural gas from the top of the contactor apparatus.

7. The method of claim 6, wherein the glycol is selected from the group consisting of ethylene glycol, diethylene glycol, and triethylene glycol.

8. The method of claim 6, wherein the contactor is selected from the group consisting of a tray contactor apparatus, a structured packed column contactor apparatus, or a random packed column contractor apparatus.

9. The method of claim 6, further including the step of g. reboiling the rich glycol to yield lean glycol.

10. The method of claim 6, further including the step of g. stripping the rich glycol to yield lean glycol.

11. A method for dehydrating a stream of wet natural gas flowing through at least two separators, said method comprising the steps of:

a. introducing lean glycol into a stream of partially dehydrated natural gas immediately preceding a first separator;

b. mixing said lean glycol with the stream of partially dehydrated natural gas to form a co-current flow of lean glycol and partially dehydrated natural gas;

c. introducing said co-current flow of lean glycol and partially dehydrated natural gas into the first separator;

d. extracting dehydrated natural gas from the top of the first separator;

e. extracting a flow of semi-rich glycol from the first separator;

f. passing the stream of wet natural gas and said flow of semi-rich glycol through an orifice to form a co-current flow of wet natural gas and semi-rich glycol;

g. introducing the co-current flow of wet natural gas and semi-rich glycol into a second separator; and h. separating rich glycol from said co-current flow of wet natural gas and semi-rich glycol to leave the stream of partially dehydrated natural gas.

12. The method of claim 11, wherein the glycol is selected from the group consisting of ethylene glycol, diethylene glycol, and triethylene glycol.

13. The method of claim 11, further including the step of g. reboiling the rich glycol to yield lean glycol.

14. The method of claim 11, further including the step of g. stripping the rich glycol to yield lean glycol.

15. A contactor apparatus for dehydrating a stream of natural gas flowing from the bottom to the top of the contactor apparatus, said contactor apparatus comprising:

a. a port for introducing lean glycol into the top of the contactor apparatus counter to the flow of wet natural gas through the contactor apparatus;

b. a port for extracting a flow of semi-rich glycol from the contactor apparatus, said port being located in the central portion of the contactor apparatus;

c. means for creating a co-current flow of semi-rich glycol and wet natural gas from said flow of semi-rich glycol and wet natural gas;

d. a port for introducing said co-current flow of semi-rich glycol and wet natural gas into the bottom of the contactor apparatus;

e. a port for extracting rich glycol from the bottom of the contactor apparatus; and f. a port for extracting dehydrated natural gas from the top of the contactor apparatus.

16. The contactor of claim 15, wherein the co-current creating means is selected from the group consisting of an orifice plate, an atomizer, and a venturi.

17. A gas dehydrator system comprising:

a. a contactor apparatus according to claim 15 and b. means for reconditioning the rich glycol to yield lean glycol.

18. The gas dehydrator system according to claim 17, wherein said reconditioning means is selected from the group consisting of a reboiler, reconcentrator and a stripper.

19. A dehydrator system for dehydrating wet natural gas comprising:

a. a contactor apparatus for dehydrating a stream of partially dehydrated natural gas flowing from the bottom to the top of the contactor apparatus, said contactor apparatus having i. a port for introducing lean glycol into the top of the contactor apparatus counter to the flow of partially dehydrated gas through said contactor apparatus;

ii. a port for extracting a flow of semi-rich glycol from said contactor apparatus, said port being located in the central portion of said contactor apparatus;

iii. a port for introducing the flow of partially dehydrated gas; and iv. a port for extracting dehydrated natural gas from the top of said contactor apparatus; and b. a separator for separating rich glycol from a co-current flow of the semi-rich glycol and wet natural gas, said separator having i. a port for introducing said co-current flow of semi-rich glycol and wet natural gas into said separator;

ii. means for creating a co-current flow of semi-rich glycol and wet natural gas from said flow of semi-rich glycol and wet natural gas;

iii. a port for extracting rich glycol from the bottom of said separator; and iv. a port for extracting partially dehydrated natural gas from the top of said separator.

20. The dehydrator system of claim 18, wherein the co-current creating means is selected from the group consisting of an orifice plate, an atomizer, and a venturi.

21. The dehydrator system of claim 18, further comprising:

a. means for reconditioning the rich glycol to yield lean glycol.

22. The gas dehydrator system according to claim 18, wherein the reconditioning means is selected from the group consisting of a reboiler, reconcentrator and a stripper.

23. A dehydrator system for dehydrating wet natural gas comprising:

a. means for introducing lean glycol into the flow of partially dehydrated gas immediately preceding a first separator to form a co-current flow of lean glycol and partially dehydrated gas;

b. said first separator for dehydrating a stream of partially dehydrated natural gas, said first separator having
  i. a port for introducing a co-current flow of lean glycol and partially dehydrated gas into said first separator;
  ii. a port for extracting a flow of semi-rich glycol from said first separator; and
  iii. a port for extracting dehydrated natural gas from the top of said first separator; and c. a second separator for separating rich glycol from a co-current flow of the semi-rich glycol and wet natural gas, said second separator having
  i. a port for introducing said co-current flow of semi-rich glycol and wet natural gas into said second separator;
  ii. means for creating a co-current flow of semi-rich glycol and wet natural gas from said flow of semi-rich glycol and wet natural gas;
  iii. a port for extracting rich glycol from the bottom of said second separator, thereby leaving partially dehydrated natural gas; and
  iv. a port for extracting said partially dehydrated natural gas from the top of said second separator.

24. The dehydrator system of claim 23, wherein the co-current creating means is selected from the group consisting of an orifice plate, an atomizer, and a venturi.

25. The dehydrator system of claim 23, further comprising:

a. means for reconditioning the rich glycol to yield lean glycol.

26. The gas dehydrator system according to claim 23, wherein the reconditioning means is selected from the group consisting of a reboiler and a stripper.

\* \* \* \* \*